United States Patent [19]
Mullin et al.

[11] 4,099,338
[45] Jul. 11, 1978

[54] SOLAR ASSISTED DRYER APPARATUS AND METHOD

[75] Inventors: Joseph V. Mullin, Cherry Hill, N.J.; W. Edwin Sauer, Douglasville, Pa.

[73] Assignee: Proctor & Schwartz, Inc., Philadelphia, Pa.

[21] Appl. No.: 740,619

[22] Filed: Nov. 10, 1976

[51] Int. Cl.² .................................. F26B 3/04
[52] U.S. Cl. ............................... 34/35; 34/68; 34/86; 126/270
[58] Field of Search ............... 34/35, 86, 68, 93, 212, 34/216; 237/1 A; 126/270

[56] References Cited
U.S. PATENT DOCUMENTS

| | | | |
|---|---|---|---|
| 2,529,621 | 11/1950 | Mayo | 237/1 A |
| 2,599,721 | 6/1952 | Remington et al. | 34/216 |
| 3,066,423 | 12/1962 | Solem | 34/86 |

Primary Examiner—John J. Camby
Assistant Examiner—Larry I. Schwartz
Attorney, Agent, or Firm—Richard H. Thomas

[57] ABSTRACT

Drying apparatus and process are shown featuring a fresh gas flow warmed for obtaining a low temperature rise in comparatively large volume by solar heat collection, then further heated and passed into drying relationship with the material to be dried.

7 Claims, 2 Drawing Figures

SOLAR ASSISTED DRYER APPARATUS AND METHOD

BACKGROUND OF THE INVENTION

This invention relates to solar energy-assisted drying, eg. dehydration, typically tobacco drying, titanium dioxide drying, onion dehydrating, polyester fiber heat setting, nut roasting, and breakfast cereal toasting. Thus, the term "drying" herein is used broadly whether or not much, if any, water or other liquid is removed from the goods in process; in some cases such operation is accompanied by a toasting or cooking, and in many other cases such change in product character is guarded against by careful control of temperature and drying rate.

Heretofore many goods including foods were dried by exposure to the sun's rays in the presence of adequate ventilation. Typical continuous through circulation dryers now conventionally used for drying vegetables, fruits, etc., have a natural gas burner which discharges its hot combustion into a mixture of recycled vapors from the drying bed and makeup air from the outside; the resulting hot gas and vapor mixture is drawn with a fan from a gas mixing plenum and blown into drying contact, eg. downwardly or upwardly through the gas-permeable bed of the goods to be dried. Such bed usually is supported by a conveyor or truck line passing transversely to the flow of this warm gas. The gas is withdrawn from the drying contact, and most of it is recycled for reheating (and, thus, dehumidification) while a portion is exhausted to atmosphere as spent gas. While there are many other types of continuous through circulation dryers, these are well known to those skilled in the art and will not be dealt with here. It is well known also in the operation of such dryers to recoup heat by exchanging the heat of the spent gases with the incoming makeup air to the dryer (frequently using heat wheels, indirect heat exchangers, regenerative exchange, and the like).

Solar air heaters (collectors) are not new, but have come into recent popularity as a result of the desire to conserve petroleum and natural gas. Solar heater (collector) units especially useful in connection with the present invention are shown in Australian Pat. No. 276,788, published on Nov. 26, 1965, and U.S. Pat. No. 3,908,631 of Sept. 30, 1975. If the collectors are rigid, they need not have auxiliary blowers to inflate them for the instant purpose, although these can be used if desired.

Advantages of the present invention over prior proposals include: the fact that solar energy is used only to augment the drying process, and then in a way for obtaining practical solar heating at very low capital cost, a prime consideration even in high fuel cost areas; and the solar energy need not be stored in the system at the expense of building storage facilities, but can be used directly for effecting fuel savings during sunlit hours; the solar collector is disposed for obtaining high air flow rates and only modest temperature rise. This makes the instant apparatus particularly economic in comparison to other proposed solar heating systems, particularly where the air or gas flow therethrough is minimized and its temperature maximized, making the invention especially adaptable to use low temperature dehydration processes.

SUMMARY OF THE INVENTION

One aspect of this invention is dryer apparatus unit comprising: a primary heater for heating gases; in communication therewith a drying chamber equipped with an inlet for a flow of drying gas and an outlet for a flow of spent gas, and inlet and outlet means for material to be dried; an exhaust line for withdrawing spent gas from said drying chamber; solar warming means for a fresh flow of diluent gas, said solar warming means being adapted for only modest warming of said fresh flow at high flow rate; means directing said fresh flow of diluent gas into further heating relationship with said primary heater for forming said flow of drying gas; and means driving said flow of drying gas through said drying chamber.

Another aspect of this invention is a process for drying goods which comprises: warming a comparatively large flow of fresh diluent gas by solar heat collection to obtain a small temperature rise in said flow; heating further said flow of diluent gas in a primary heating zone, thereby forming a flow of drying gas; directing said flow of drying gas into drying relationship in a drying zone with the material to be dried; and withdrawing spent gas from said drying zone.

THE DRAWINGS

The drawings are the basis for design of a low temperature (about 82°–93° C. or 180–200° F.) vegetable dryer unit (one zone of the third stage of a four-stage Proctor vegetable dryer having a total of 8–12 zones) in central California where the daily insolation is about 2,000 BTU/ft.$^2$ (about 5,425 Kg-cal per square meter) of roof-mounted solar collector operating at about 70% efficiency minimum. Desirably all air drawn into the system is filtered or otherwise cleansed conventionally for foreign particle removal, and even humidified where necessary or desirable. In this region simply bird and bug screening is adequate filtration in most cases.

In the drawings heat insulation, instrumentation, flow regulating devices, power sources and the like are not shown, but are to be supplied where necessary or desirable.

DETAILED DESCRIPTION

Figure 1:
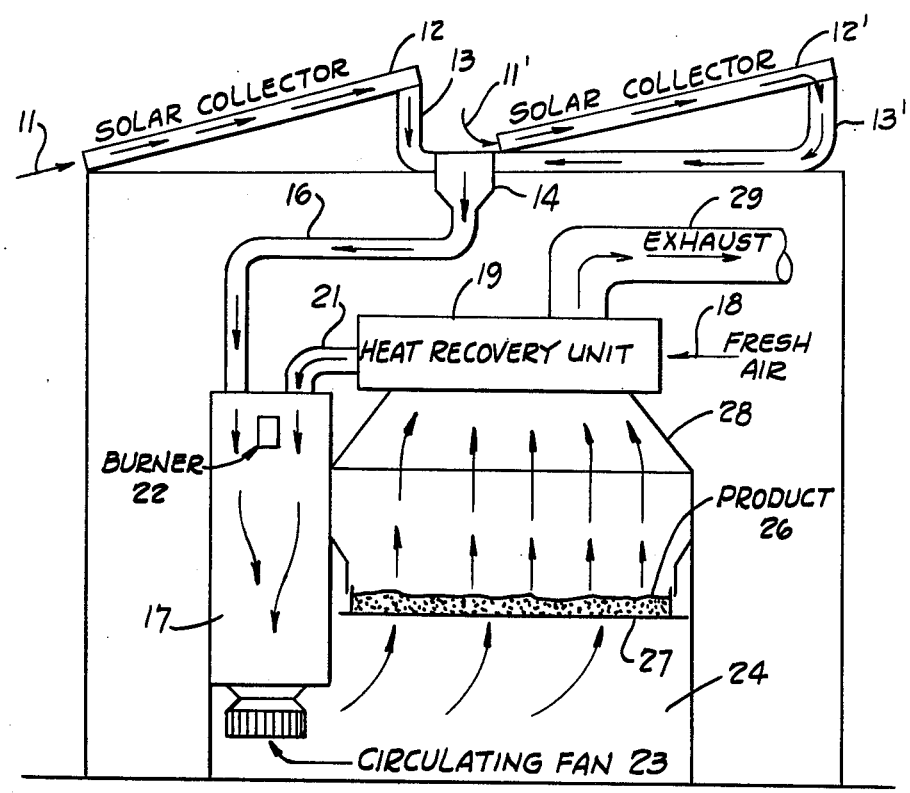
FIG. 1 is a vertical cross-section of the present invention.

FIG. 1 is a vertical cross section of such unit. Air enters inlet 11 of solar collector bank of collector modules 12 and inlet 11' of solar collector bank of collector modules 12'. These banks are inclined to southern exposure at an angle of about 25° from the horizontal. Preferably, for economy, such angle is fixed, but the collector mounting can be adjustable as to angle for the season if desired, or the collector can be horizontal. They are discussed in more detail in connection with FIG. 2, following. The flows 11 and 11' are 600 CFM per each module, i.e. 16,990 liters per minute (measured at 70° F. and 29.92 inches Hg or 21.1° C. and 760 Torr), or 10 CFM per square foot (i.e. 283 liters per square meter per minute) of exposed surface area. Each collector module in a bank thereof has a flat top surface 15 feet (4.57 meters) long, is 4 feet (1.22 meters) wide, and has air passages totalling about 96 square inches (619 square cm.) in its overall cross-section. While only two such modules are shown in the drawing, other like modules are similarly connected in parallel flow to provide as much as 40,000 CFM air (about 1,132,000 liters per minute) to the burner plenum 17.

The air for solar warming enters the collectors at 80° F. (26.7° C.) and exits at 95° F. (35° C.) with a pressure drop of 0.34 inches (0.86 cm.) of water through a collector, requiring fan powder of about 0.167 hp. (125 watts). Thus-warmed, it then passes through ducts 13 and 13' into header 14, ducting 16, and into burner plenum 17.

Simultaneously a flow of fresh air 18 (55,000 CFM, i.e. about 1,600,000 liters per minute) passes through heat recovery unit 19, a conventional indirect heat exchanger where it is warmed by spent drying gases which are exhausted through duct 29. Thus warmed, this flow passes through duct 21 into burner plenum 17 with the flow from ducting 16. Therein they mix with hot combustion gases from burner 22 fed by natural gas and combustion air from sources not shown to form the drying gas for the operation.

Circulating fan 23 takes drying gas flow suction from plenum 17 and discharges it under slight pressure into the base of drying chamber 24, upwardly through the bed of product to be dried 26, hood 28, heat recovery unit 19, and out exhaust line 29 as spent gas.

Product 26 is sliced vegetable (eg., beets, carrots, etc., initial pieces in fresh state averaging about 2-4 mm. thick and varying lengths from randomly sliced or diced feed) supported on foraminous conveyor 27, at bed depth of about 20-100 cm. During the operation the conveyor moves transversely to the flow of gas in chamber 24 and essentially horizontally through an inlet port and out of an outlet port of the drying chamber. Such ports are not shown, but are conventional.

Typically such vegetable product is dried to a moisture content of not above about 2%, utilizing about 20,000-30,000 BTU per hour per square foot (about 50,000-75,000 Kg cal per square meter) in a dryer about 5 meters wide by 35 meters in total length. Ordinarily it is most practical to have a series of drying stages, each with one or more drying zones, with one of the latter zones being like that shown in FIG. 1, with exhaust line 29 from such zone communicating with a prior dryer zone of the series. Such exhaust often is fed into another burner zone or otherwise warmed by heat exhange for staged drying of the goods. The feed into the first of the series of dryer units acting on the conveyed goods is continuous, as is the travel through the series and the dry output from the ultimate processing unit (which can be a cooler).

Figure 2:
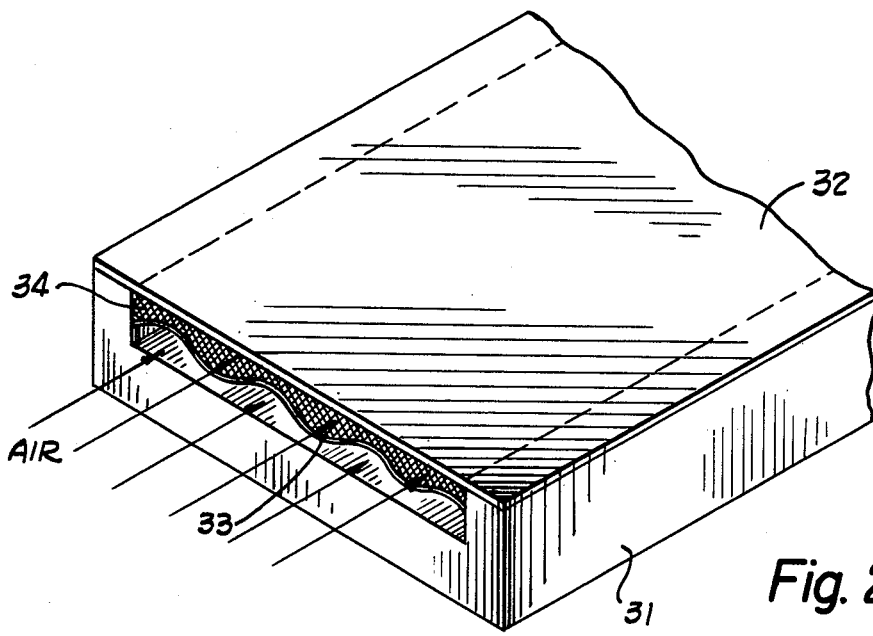
FIG. 2 is an isometric cut-away partial view of a solar collector module element used in the present invention.

FIG. 2 shows in more detail an isometric cut-away partial view of a solar collector module element used in this operation. Two banks of these typically 20 in a bank, are used with the air flows in all such modules being in parallel flow connection. Rigid frame 31 can be made of metal, wood, plastic, etc. Desirably, it is insulated for retention of heat on the bottom and on the sides exposed to atmosphere. Inlet air to the module is screened by screen 34 (shown as if cut away from the lower gas passage for emphasis, but actually covering that passage too). Clear, flat glass plate 32 is mounted on frame 31 and caulked to eliminate leakage. Item 33 is a corrugated metal collector plate with its upper surface being coated for high solar heat pickup (eg., a dull, flat black paint). It is attached to the walls of the frame and supported thereby, but such attachment need not be hermetic.

A small low velocity air flow (typically from a few percent to perhaps as much as about 20% of the total air flow through the module) passes between the upper surface of the collector plate and the lower surface of the transparent cover; this tyypically is regulated by one or more apertures, filter elements and/or dampers or the like. The balance of the air passes under the collector plate and is the main heat sink. Both flows merge in header 13 or 13' for delivery to burner plenum 17. Accordingly, detrimental condensation can be averted on the transparent cover, and expensive evacuation of the zone immediately therebelow is not needed. While the air below the collector plate (about 10-50 feet per second, i.e. 3-15 meters per second) is at higher velocity than that above (about 1-2 feet per second, i.e. 0.3-0.6 meters per second), both are in a low flow region, and the relatively short collector provides high flexibility in design and low pressure drop with relatively high solar heat absorption efficiency; it can absorb, i.e. convert up to about 80% of the original incident solar energy into immediately usable heat energy for drying.

It should be noted specially for criticality here that a comparatively large flow of gas (preferably air, but otherwise innocuous drying gas or vapor if available and desirable) is to be warmed by the solar energy to a very modest or small temperature rise in this scheme (a flow of at least about 200 CFM, i.e. about 5,663 liters per minute and preferably about 500-700 CFM, i.e. about 14,158 to 19,820 liters per minute per solar collector module with a temperature rise of about 10-20° F., i.e. about 5° to 10° C.). Furthermore, the total of such flows from all collector modules desirably is at least about 10,000 CFM, i.e. 283,000 liters per minute and advantageously 2-5 times that amount. The desirability of low velocity flow in such collectors and ducts (collectively their "ducting" as the solar collector modules act as ducts) has been dealt with earlier. The proportion of fresh air flow into inlet 18 relative to the air influx for solar warming (volumetric, same basis) in sunlit hours advantageously is from about 1 to 2:1 and preferably about 1.4:1 for economy and efficiency in the operation of FIG. 1 apparatus. When the sun does not shine, the dryer unit is operated with fresh air only from inlet 18.

While the foregoing has been shown in quite specific detail, it should be clear that one skilled in the art can make many modifications without departing from the inventive concept. The materials of construction are conventional, eg., sheet metal for ducting and chambers, wood, metal, glass, and/or plastic for the solar collectors. The transparent plate over the solar collector need not be flat, but often is desirably arcuate, and could be dispensed with in some designs where other means are relied on for keeping the collector plate clean, eg., rinsing, blowing, etc. While more than one fan, blower, compressor, or other gas-driving means can be used in the drying unit shown, similar drying units can be made to operate with pressure or suction from more remote sources. Heat insulation is to be used where necessary or desirable.

The primary heater shown is a natural gas burner. This also can be operated on fuel oil or other conventional fuels, or it can even be a group of steam or otherwise heated coils over which the first and second diluent gases flow for warming. Some of the solar-warmed second flow of diluent gas also can be used for primary or secondary combustion air with the fuel, if desired.

A variety of conveying means for the goods to be dried can be used. These are conventional and include belt conveyors, individual trucks in series, chain link conveyors, tentering or drawing means for moving wet cloth, carpet, filaments or the like into and out of the drying zone. The drying gas flow can be upward as shown or downward or even cross-flow, if desired, with appropriate repositioning of the gas handling elements. While a continuous drying operation is preferred with goods continuously entering a chamber inlet port, moving through the chamber, then out a chamber outlet port, the goods can remain static for a time in the drying chamber and inlet and exit the same port if desired.

Clearly, dry sunlit regions such as parts of the American southwest are superior locations for practicing this invention, and there should be no illusions that, with the present prices of natural gas or other fossil fuel, that the invention will save money in many places. It will save fuel, and the simplicity of concept and construction of the inventive apparatus is extremely important to a practical installation. Use of the invention can save as much as about 5–20% or more of the fossil fuel otherwise needed, and where availability of such fuel is restricted or the price of such fuel is high, these are important considerations (as are governmental incentives) to practice the invention. Low temperature dehydration processes in areas of high solar insolation are the prime candidates for practice of this invention. The invention is especially adaptable to low maintenance operation for production runs of as much as 200 or more days per year.

We claim:

1. A dryer apparatus unit comprising:
   a primary heater for heating gases;
   a drying chamber comprising an inlet for a flow of drying gas, and inlet and outlet means for material to be dried;
   means communicating the primary heater with the drying chamber inlet;
   an exhaust line for withdrawing spent gas from said drying chamber;
   solar warming means for a fresh flow of diluent gas, said solar warming means being adapted for large, low velocity gas flow and imparting small temperature rise of the gas flow therethrough;
   a heat exchanger disposed in said exhaust line for warming diluent gas from another source other than the solar warming means by heat exchange with said spent gas;
   ducting means directing said fresh flow of diluent gas and the diluent gas from another source into further heating relationship which said primary heater for forming said flow of drying gas; and
   driving means for passing said flow of drying gas through said drying chamber.

2. The apparatus of claim 1 wherein said primary heater is a fuel combustor disposed for discharging its combustion products into blending relationship with the preheated diluent gas flows.

3. The apparatus of claim 1 where all diluent gas flows are atmospheric air, and the ducting for said solar-warmed gas flow is adapted for establishing flow of same in a proportion of about 1–2 units per unit of other diluent gas flows.

4. A process for drying material which comprises:
   warming a large flow of fresh diluent gas by solar heat collection to obtain a small temperature rise in said flow;
   warming a second flow of diluent gas;
   heating further said flows of diluent gas in a primary heating zone, thereby forming a flow of drying gas;
   directing said flow of drying gas into drying relationship in a drying zone with the material to be dried; and
   withdrawing spent gas from said drying zone;
   the second flow of diluent gas being heated by heat exchange with said spent gas.

5. The process of claim 4 wherein the further heating of the solar-heated diluent gas and second flow of diluent gas is done by blending the same with hot combustion products from a burner.

6. The process of claim 5 wherein the volumetric ratio of said second flow of diluent gas to the flow of fresh air for solar warming is about 1–2:1.

7. The process of claim 4 wherein the material to be dried is passed through a plurality of drying units with at least a portion of the withdrawn spent gas from one unit being passed back to the preceding unit for drying use therein while the material being dried in said preceding unit being passed forward to the unit whence said spent gas is withdrawn.

* * * * *

UNITED STATES PATENT OFFICE
CERTIFICATE OF CORRECTION

Patent No. 4,099,338      Dated July 11, 1978

Inventor(s) Joseph V. Mullin et al.

It is certified that error appears in the above-identified patent and that said Letters Patent are hereby corrected as shown below:

Column 1, line 22, after "combustion" insert --products--.

Column 3, line 9, "powder" should read --power--.

Column 4, line 5, "tyypically" should read --typically--.

Signed and Sealed this

Nineteenth Day of December 1978

[SEAL]

Attest:

RUTH C. MASON
*Attesting Officer*

DONALD W. BANNER
*Commissioner of Patents and Trademarks*